(12) United States Patent
Martin

(10) Patent No.: US 6,748,590 B1
(45) Date of Patent: Jun. 8, 2004

(54) METHOD FOR GENERATING INSTRUCTION SEQUENCES FOR INTEGER MULTIPLICATION

(75) Inventor: Allan R. Martin, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/717,410

(22) Filed: Nov. 21, 2000

(30) Foreign Application Priority Data

Sep. 18, 2000 (CA) ............................................. 2319888

(51) Int. Cl.⁷ ................................................ G06F 9/45
(52) U.S. Cl. ...................................... 717/161; 708/627
(58) Field of Search ................................ 708/277, 517, 708/606, 620–632; 717/151–161, 140–145, 106

(56) References Cited

U.S. PATENT DOCUMENTS 5,600,569 A * 2/1997 Nishiyama et al. ............ 716/1
5,907,711 A * 5/1999 Benitez ...................... 717/145
6,223,197 B1 * 4/2001 Kosugi ........................ 708/620

OTHER PUBLICATIONS

Berstein R., "Multiplication by Integer Constants", 1986, Software–Practice and Experience, vol. 16(7) pp. 641–652.*
P. Briggs and T. Harvey, "Multiplication by Integer Constants", Jul. 13, 1994, http://softlib.rice.edu/MSCP.*

* cited by examiner

Primary Examiner—Kakali Chaki
Assistant Examiner—Tuan Anh Vu
(74) Attorney, Agent, or Firm—Douglas W. Cameron; Anne V. Dougherty

(57) ABSTRACT

The invention pertains to an improved method for generating ALU instruction sequences for performing integer multiplication. The invention analytically helps to find an optimal sequence of shift, add and subtract instructions for performing integer multiplication by trying to add or subtract all powers of 2 less than the integer multiplier itself and then trying to factor evenly the resulting sum or difference by that power of 2 plus or minus one. If each such resulting factor value factors by a power of 2, the corresponding factor set is a favorable one for generating an optimal ALU instruction sequence.

30 Claims, 5 Drawing Sheets

METHOD FOR GENERATING INSTRUCTION SEQUENCES FOR INTEGER MULTIPLICATION

FIELD OF THE INVENTION

The present invention relates to generating sequences of shift, add, and subtract instructions to perform multiplication by an integer value.

BACKGROUND OF THE INVENTION

Many implementations of computer processors do not have a multiply instruction. For those processors that do have a multiply instruction, it is often very expensive because it can take many machine clock cycles to perform a multiply instruction. However, it is possible to perform multiplication by an integer value using just normal arithmetic and logical unit (ALU) instructions of the processor such as the common shift, add, and subtract processor instructions. An unknown value can be multiplied by a power of 2 by shifting the unknown value left by the exponent of the power of 2. The original unknown value or an intermediate result can then be added or subtracted to achieve multiplication by integers that are not powers of 2. Usually shift, add, and subtract instructions can be performed in one machine clock cycle per instruction, so sequences of these instructions to perform multiplication are preferable to a multiply instruction when a sufficiently short sequence can be found that will execute faster than the multiply instruction.

Sequences of ALU instructions to perform integer multiplication by an integer value are commonly generated using either an analytical algorithm at compile time, or by looking up a sequence in a previously generated table.

Two possible analytical approaches to generating integer multiplication sequences are discussed in D. Knuth, The Art of Computer Programming, Vol. 2: Serinumerical Algorithms, 2nd Ed., Addison-Wesley, Reading, Mass., 1981, pp. 441–462 namely the binary method and the power tree method. These two methods are further discussed in R. Bernstein, Multiplication by Integer Constants, Software—Practice and Experience, vol. 16(7), pp. 641–652, John Wiley & Sons, Ltd. (1986) and combined into a hybrid method. This hybrid method can generate a sequence of shift, add, and subtract instructions for performing multiplication by any integer value. Furthermore, Bernstein's method generates very efficient sequences that are often the minimum number of instructions possible to perform the multiplication using just shift, add, and subtract instructions. However, a skilled assembly language programmer can sometimes find sequences of shift, add, and subtract instructions that are shorter than those generated using Bernstein's method.

Another method for generating efficient sequences of instructions for performing multiplication by integer values is through the use of a lookup table. This involves generating a table that holds the optimal sequence of ALU instructions for multiplication by each integer. The advantage to using this method is that every possible combination of shift, add, and subtract instructions that combine to achieve multiplication by a particular integer can be tested until the most efficient sequence is produced. The amount of time taken to generate these sequences is not a factor because they are generated separately beforehand, rather than during a programs compilation.

The disadvantage to using the lookup table method is that sequences for every possible integer value must be stored in the lookup table, which can require a large amount of memory storage. For example, assume that each ALU instruction can be encoded such that the instruction opcode and its operands can be packed into 32 bits. For 32-bit integers, multiplication can usually be performed in 20 shift, add, and subtract instructions or fewer, so 20*32 bits should be reserved for each sequence. To encode all of this information in a table for all 32-bit integers, $(2^{\wedge\wedge}32)*(20*32$ bits$)=343.6$ terabytes of storage would be required. Since this amount of information is far too large to be incorporated into a compiler, the table size must be reduced by restricting the length of sequences, the number of sequences included in the table, or the amount of information for each instruction.

It is difficult to represent a sequence of instructions in a compact manner without losing some flexibility in the generated sequence of instructions. The lookup table method will likely impose a maximum length on sequences of instructions so that the table size is minimized, which constrains the possible sequences generated. Also, to minimize the size of the lookup table, a subset of all integers will usually be chosen to be represented in the table. The lookup table representation disclosed in U.S. Pat. No. 5,764,990 manages to pack representations of sequences for each integer into 64 bits in the lookup table. However, this lookup table implementation faces both the constraint that only a maximum of 8 instructions can be used in a sequence and that only numbers between −65536 and 65535 are generated so that the lookup table is not too large. This approach can not always represent the most efficient sequence of shift, add, and subtract instructions for all integers, but is quite good for smaller numbers that have short generated sequences.

Also, it has been shown in T. Granlund, P. Montgomery, Division By Invariant Integers using Multiplication, Association of Computing Machinery, 0-89791-662-x/94/0006 (1994) that division by integer constants can be accomplished using integer multiplication followed by a shift right instruction. Thus, sequences of shift, add, and subtract instructions can be used to accomplish integer division as well as multiplication.

Thus, it is desirable to provide a method, system and computer program product for generating an efficient sequence of ALU instructions for performing integer multiply operations that overcomes the foregoing and other disadvantages.

SUMMARY OF THE INVENTION

The present invention is an improvement on the analytical algorithm for generating ALU instruction sequences for performing integer multiplication described by Bernstein. The present invention analytically finds an optimal sequence of shift, add and subtract instructions for performing multiplication by any integer value, improving on the results of the Bernstein algorithm which in some cases produces longer instruction sequences than required for a particular integer multiplication.

The present invention has an advantage of generating instruction sequences having at most as many instructions as would be generated by the Bernstein algorithm but optimally generating sequences having fewer instructions than as would be generated using the Bernstein algorithm, thus facilitating the increased speed at which a compiled program could run and reducing the size of the program's code. By relying on a dependent chain of instructions, what Knuth calls a "star chain", the present invention helps reduce the number of temporary registers required during multiply (and thus increase execution speed) because each instruction depends on the result of the preceding instruction. Further, the present invention helps the reduce the actual number of ALU instructions needed in a program to perform the multiply and hence helps reduce program size.

The present invention also has an advantage of not being significantly more expensive computationally. It looks for the same instruction sequences as Bernstein's hybrid binary and power tree algorithm using the same method, and only searches for the additional performance opportunities when a sufficiently fast instruction sequence is not found with Bernstein's method.

Further, the present invention has an advantage over the table lookup method of generating instruction sequences for performing multiplication by an integer value by not having to rely on a lookup table. To generate the same optimal sequences of ALU instructions of the present invention, a relatively large amount of information would need to be stored in a lookup table for each instruction sequence, resulting in a massive storage requirement. Moreover, the present invention has no upper limit to the highest integer value it can handle, a limitation which a lookup table inherently possesses.

Accordingly, there is provided a computer-implemented method for multiplication by an integer comprising the steps of (a) recursively finding the factors of the integer using a power of 2, a power of 2 plus 1 and a power of 2 minus 1; (b) recursively finding the factors of the integer (or the factors found in (a)) plus and minus 1; using a power of 2, a power of 2 plus 1; and a power of 2 minus 1; (c) adding to and subtracting from the integer all powers of 2 less than the integer; (d) finding the factors of each resulting sum and difference of (c) using the power of 2 used in calculating the sum and difference of (d) (c) plus and minus 1; (e) constructing one or more instruction sequences based upon the factors found in (a) and (b), and upon the factors found in (d) if a resulting sum or difference factored evenly in (d) and the resulting factor is a power of 2, (f) finding the lowest cost instruction sequence from the one or more instruction sequences; and (g) executing the lowest cost instruction sequence to effect the multiplication by the integer. The above method is also provided wherein the step of constructing one or more instruction sequences comprises generating one or more shift, add or subtract instructions based upon the found factors. The above method is further provided wherein steps (a)–(f) are performed in a compiler. And the above method is provided wherein the step of finding the lowest cost instruction sequence comprises calculating a cost for each instruction sequence based upon the processing time of each instruction sequence.

There is also provided a method for generating instruction sequences for multiplication by an integer comprising the steps of (a) recursively finding the factors of the integer using a power of 2, a power of 2 plus 1 and a power of 2 minus 1; (b) recursively finding the factors of the integer (or the factors found in (a)) plus and minus 1 using a power of 2, a power of 2 plus 1 and a power of 2 minus 1; (c) adding to and subtracting from the integer all powers of 2 less than the integer; (d) finding the factors of each resulting sum and difference of (c) using the power of 2 used in calculating the sum and difference of (c) plus and minus 1; (e) constructing one or more instruction sequences based upon the factors found in (a), and (b), and upon the factors found in (d) if a resulting sum or difference factored evenly in (d) and the resulting factor is a power of 2, and (f) finding the lowest cost instruction sequence from the one or more instruction sequences. The above method is also provided wherein the step of constructing one or more instruction sequences comprises generating one or more shift, add or subtract instructions based upon the found factors. The above method is also provided wherein steps (a)–(f) are performed in a compiler. And the above method is provided wherein the step of finding the lowest cost instruction sequence comprises calculating a cost for each instruction sequence based upon the processing time of each instruction sequence.

Further, there is provided a computer-implemented method for multiplication by an integer comprising the steps of (a) adding to and subtracting from the integer all powers of 2 less than the integer; (b) finding the factors of each resulting sum and difference of (a) using the power of 2 used in calculating the sum and difference of (a) plus and minus 1; (c) if a resulting sum or difference factored evenly in (b) and the resulting factor is a power of 2, constructing one or more instruction sequences based upon the factors found (b); and (d) executing the instruction sequence to effect the multiplication by the integer. The above method also is provided wherein the step of constructing one or more instruction sequences comprises generating one or more shift, add or subtract instructions based upon the found factors. The above method is also provided wherein steps (a)–(c) are performed in a compiler. And, the above method may further comprise the steps of determining one or more instruction sequences based upon the Bernstein algorithm and determining the lowest cost instruction sequence from among the one or more sequences determined using the Bernstein algorithm and the one or more instruction sequences constructed in step (c).

Also provided is a method for generating instruction sequences for multiplication by an integer comprising the steps of (a) adding to and subtracting from the integer all powers of 2 less than the integer; (b) finding the factors of each resulting sum and difference of (a) using the power of 2 used in calculating the sum and difference of (a) plus and minus 1, and (c) if a resulting sum or difference factored evenly in (b) and the resulting factor is a power of 2, constructing one or more instruction sequences based upon the factors found (b). The step of constructing one or more instruction sequences may also comprise generating one or more shift, add or subtract instructions based upon the found factors. The above method may also be provided wherein the steps are performed in a compiler. And, the above method may further comprise the steps of determining one or more instruction sequences based upon the Bernstein algorithm and determining the lowest cost instruction sequence from among the one or more sequences determined using the Bernstein algorithm and the one or more instruction sequences constructed in step (c).

There is further provided a computer-implemented method for multiplication by an integer comprising the steps of, for each power of 2 less than the integer, (i) adding the power of 2 to the integer, (ii) finding the factors of the sum in (i) using the power of 2 in (i) plus or minus 1, (iii) subtracting the power of 2 from the integer, (iv) finding the factors of the difference in (iii) using the power of 2 in (iii) plus or minus 1, (v) ignoring those factors determined in (ii) and (iv) where the respective sum or difference does not factor evenly by the power of 2 plus or minus 1, and (vi) where a sum or difference factors evenly in (ii) or (iv) and the resulting factor for that sum or difference is a power of 2, generating an instruction sequence based upon those factors; and executing the instruction sequence. The above method may be further provided wherein the step of generating an instruction sequence comprises generating one or more shift, add or subtract instructions based upon the found factors. The above method may also be provided wherein all steps but the step of executing are performed in a compiler. And, the above method may further comprise the steps of determining one or more instruction sequences based upon the Bernstein algorithm and determining the lowest cost instruction sequence from among the one or more sequences determined using the Bernstein algorithm and the one or more instruction sequences determined in step (vi).

Also, there is provided a method for generating instruction sequences for multiplication by an integer comprising the steps of, for each power of 2 less than the integer, (i) adding the power of 2 to the integer, (ii) finding the factors of the sum in (i) using the power of 2 in (i) plus or minus 1, (iii) subtracting the power of 2 from the integer, (iv) finding the factors of the difference in (iii) using the power of 2 in (iii) plus or minus 1, (v) ignoring those factors determined in (ii) and (iv) where the respective sum or difference does not factor evenly by the power of 2 plus or minus 1, and (vi) where a sum or difference factors evenly in (ii) or (iv) and the resulting factor for that sum or difference is a power of 2, generating an instruction sequence based upon those factors. The above method may also be provided wherein the step of generating an instruction sequence comprises generating one or more shift, add or subtract instructions based upon the found factors. The steps above may also be performed in a compiler. And, the above method may further comprise the steps of determining one or more instruction sequences based upon the Bernstein algorithm and determining the lowest cost instruction sequence from among the one or more sequences determined using the Bernstein algorithm and the one or more instruction sequences determined in step (vi).

There is further provided a program storage device, tangibly embodying computer readable program code, for causing a computer to perform the method steps of any one of the above methods.

Additionally, there is provided a computer program product for multiplication by an integer, the computer program product comprising (a) computer readable code means for recursively finding the factors of the integer using a power of 2, a power of 2 plus 1; and a power of 2 minus 1; (b) computer readable code means for recursively finding the factors of the integer (or the factors found in (a)) plus and minus 1; using a power of 2, a power of 2 plus 1 and a power of 2 minus 1; (c) computer readable code means for adding to and subtracting from the integer all powers of 2 less than the integer; (d) computer readable code means for finding the factors of each resulting sum and difference of (c) using the power of 2 used in calculating the sum and difference of (d) (c) plus and minus 1; (e) computer readable code means for constructing one or more instruction sequences based upon the factors found in (a) and (b), and upon the factors found in (d) if a resulting sum or difference factored evenly in (d) and the resulting factor is a power of 2, (f) computer readable code means for finding the lowest cost instruction sequence from the one or more instruction sequences; and (g) computer readable code means for executing the instruction sequence to effect the multiplication by the integer.

There is also provided a computer program product for generating instruction sequences for multiplication by an integer, the computer program product comprising (a) computer readable code means for recursively finding the factors of the integer using a power of 2, a power of 2 plus 1; and a power of 2 minus 1; (b) computer readable code means for recursively finding the factors of the integer (or the factors found in (a)) plus and minus 1; using a power of 2, a power of 2 plus 1; and a power of 2 minus 1; (c) computer readable code means for adding to and subtracting from the integer all powers of 2 less than the integer; (d) computer readable code means for finding the factors of each resulting sum and difference of (c) using the power of 2 used in calculating the sum and difference of (c) plus and minus 1; (e) computer readable code means for constructing one or more instruction sequences based upon the factors found in (a) and (b)r and upon the factors found in (d) if a resulting sum or difference factored evenly in (d) and the resulting factor is a power of 2, and (f) computer readable code means for finding the lowest cost instruction sequence from the one or more instruction sequences.

Furthemore, there is provided a computer program product for multiplication by an integer, the computer program product comprising (a) computer readable code means for adding to and subtracting from the integer all powers of 2 less than the integer; (b) computer readable code means for finding the factors of each resulting sum and difference of (a) using the power of 2 used in calculating the sum and difference of (a) plus and minus 1; (c) computer readable code means for, if a resulting sum or difference factored evenly in (b) and the resulting factor is a power of 2, constructing one or more instruction sequences based upon the factors found (b); and (d) computer readable code means for executing the instruction sequence to effect the multiplication by the integer.

Also, there is provided a computer program product for generating instruction sequences for multiplication by an integer, the computer program product comprising (a) computer readable code means for adding to and subtracting from the integer all powers of 2 less than the integer; (b) computer readable code means for finding the factors of each resulting sum and difference of (a) using the power of 2 used in calculating the sum and difference of (a) plus and minus 1; and (c) computer readable code means for, if a resulting sum or difference factored evenly in (b) and the resulting factor is a power of 2, constructing one or more instruction sequences based upon the factors found (b).

There is also provided a computer program product for multiplication by an integer, the computer program product comprising, for each power of 2 less than the integer, (i) computer readable code means for adding the power of 2 to the integer, (ii) computer readable code means for finding the factors of the sum in (i) using the power of 2 in (i) plus or minus 1, (iii) computer readable code means for subtracting the power of 2 from the integer, (iv) computer readable code means for finding the factors of the difference in (iii) using the power of 2 in (iii) plus or minus 1, (v) computer readable code means for ignoring those factors determined in (ii) and (iv) where the respective sum or difference does not factor evenly by the power of 2 plus or minus 1, and (vi) computer readable code means for, where a sum or difference factors evenly in (ii) or (iv) and the resulting factor for that sum or difference is a power of 2, generating an instruction sequence based upon those factors; and computer readable code means for executing the instruction sequence.

And, there is provided a computer program product for generating instruction sequences for multiplication by an integer, the computer program product comprising, for each power of 2 less than the integer, (i) computer readable code means for adding the power of 2 to the integer, (ii) computer readable code means for finding the factors of the sum in (i) using the power of 2 in (i) plus or minus 1, (iii) computer readable code means for subtracting the power of 2 from the integer, (iv) computer readable code means for finding the factors of the difference in (iii) using the power of 2 in (iii)

plus or minus 1, (v) computer readable code means for ignoring those factors determined in (ii) and (iv) where the respective sum or difference does not factor evenly by the power of 2 plus or minus 1, and (vi) computer readable code means for, where a sum or difference factors evenly in (ii) or (iv) and the resulting factor for that sum or difference is a power of 2, generating an instruction sequence based upon those factors.

BRIEF DESCRIPTION OF THE DRAWINGS

The present invention is illustrated by way of example and not limitation in the figures of the accompanying drawings in which like references indicate similar or corresponding elements and in which.

DETAILED DESCRIPTION OF THE INVENTION

Figure 1:
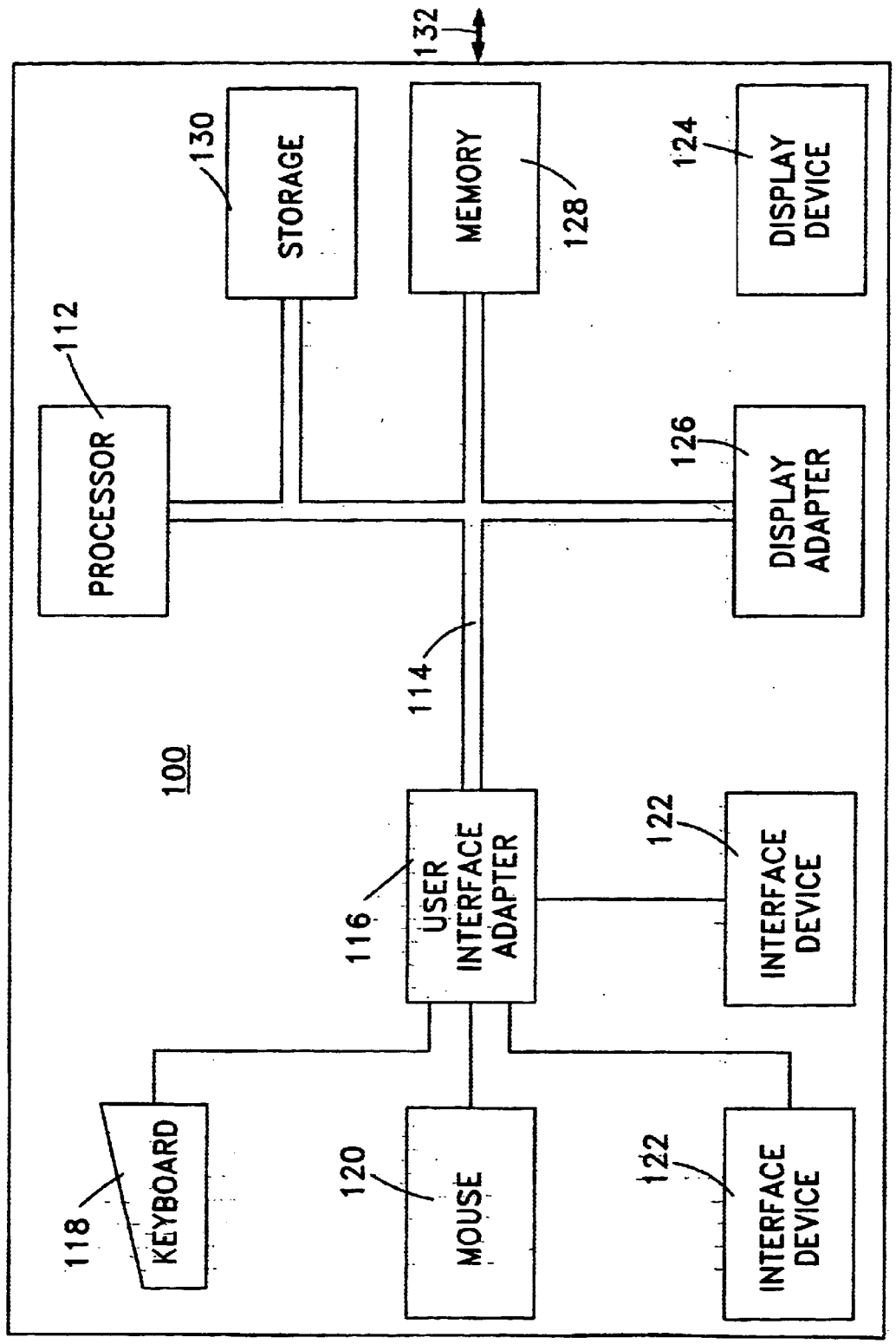
FIG. 1 is a block diagram of a computer workstation environment in which the present invention may be practiced.

FIG. 1 illustrates a representative computer hardware environment in which the present invention may be practiced. The environment of FIG. 1 comprises a representative single user computer workstation 100, such as a personal computer, including related peripheral devices. The workstation 100 includes a microprocessor 112 and a bus 114 employed to connect and enable communication between the microprocessor 112 and the components of the workstation 100 in accordance with known techniques. The workstation 100 typically includes a user interface adapter 116, which connects the microprocessor 112 via the bus 114 to one or more interface devices, such as a keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long-term storage 130 which can include a hard drive, diskette drive, tape drive, etc.

The workstation 100 may communicate with other computers or networks of computers, for example via a communications channel or modem 132. Alternatively, the workstation 100 may communicate using a wireless interface at 132, such as a CDPD (cellular digital packet data) card. The workstation 100 may be associated with such other computers in a local area network (LAN) or a wide area network (WAN), or the workstation 100 can be a client in a client/server arrangement with another computer, etc. All of these configurations and many variants thereof, as well as the appropriate communications hardware and software, are known in the art.

Figure 2:
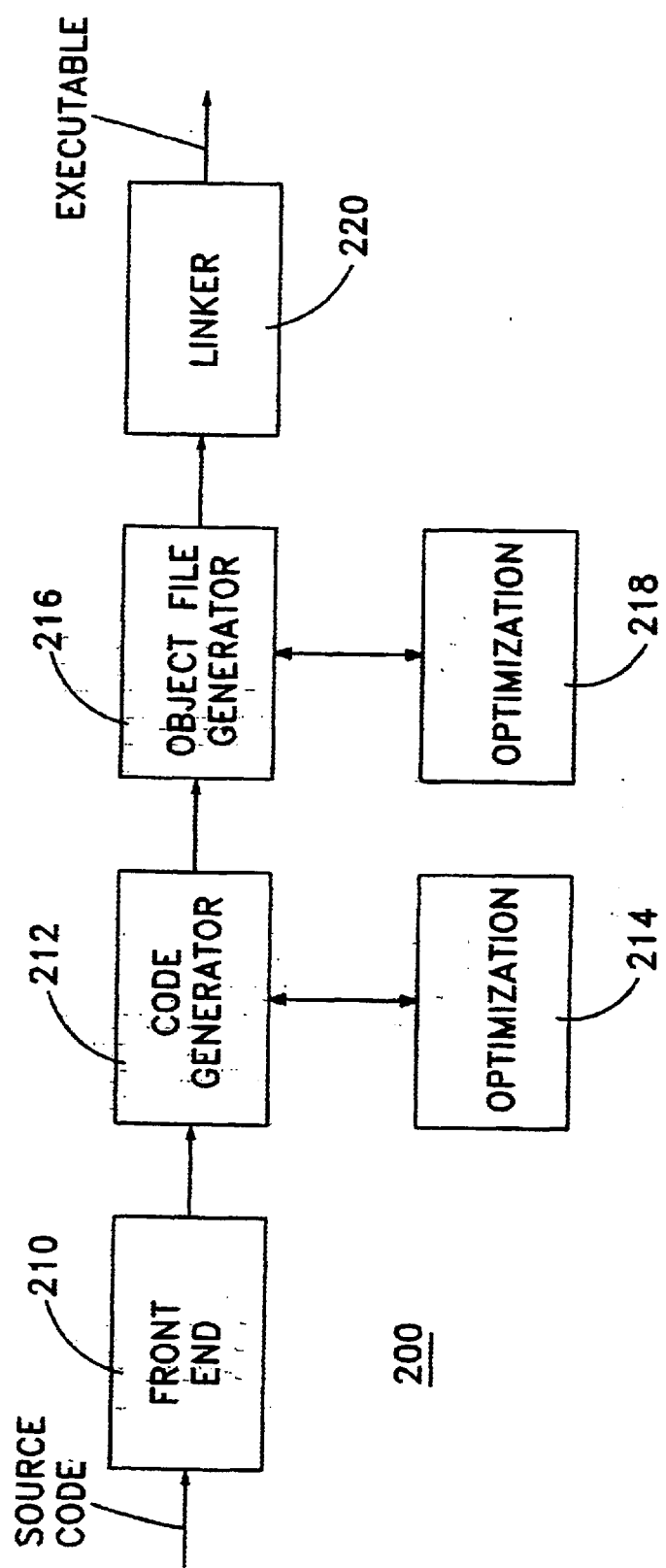
FIG. 2 is a schematic representation of the general structure of a software compiler in which the present invention may be implemented.

Further, in a preferred embodiment of the present invention, a software compiler, used to generate an executable program from source code (typically supplied by the user) that can operate on a computer hardware environment as depicted in FIG. 1, is implemented with the present invention for processing the source code that involves integer multiplication according the teachings of the present invention as further described below. FIG. 2 is a schematic representation of the general structure of a software compiler 200, that may be used in connection with the computer hardware environment shown in FIG. 1, in which the present invention may be implemented. Referring to FIG. 2, source code may be supplied into a front end component 210 of the compiler. The front end translates the source into an intermediate representation for supply to the code generator 212. Optimization 214 can be applied before or during further processing of the intermediate representation in the code generator to produce more efficient code. The output of the code generator—typically also in intermediate representation form—is then supplied to an object file generator for creating an object code file(s). Again, optimization 218 may be applied before or during further processing in the object file generator (typically in this case to make the code more efficient with respect to the particular hardware environment for which the executable code is targeted). Finally, the object code file(s) are processed by a linker 220 to generate an executable file which executable file can be run on a computer hardware environment (such as the one shown in FIG. 1). Numerous other variations of the structure of a compiler should be apparent to those skilled in the art.

As discussed earlier, the present invention is an improvement of the analytical algorithm for multiplication by integer values described by Bernstein. The Bernstein algorithm essentially looks for factors of a number that are either a power of 2, or a power of 2 plus or minus one. If factors are found, the Bernstein algorithm recursively tries to find power of 2 or power of 2 plus or minus one factors for the found factors. The Bernstein algorithm also tries finding power of 2 or power of 2 plus or minus one factors for the number (or the earlier found factors) plus or minus one in the same recursive fashion. The Bernstein algorithm then fashions an appropriate instruction sequence for each set of determined factors, calculates a cost for each instruction sequence based on the processing time cost of the instruction sequence on a particular processor, and then finds the lowest cost instruction sequence for use.

For example, for the integer constant N=24, the factoring component of the Bernstein algorithm would first find that it is divisible by 8, which is the largest power of 2 that divides 24. The resulting number is 3, which is simply $(2^{\wedge}1)1$ or $(2^{\wedge}2)-1$. A sequence corresponding to that factor set is then generated by using a shift instruction for a multiplication by a power of 2, an add or subtract instruction to achieve the power of 2 plus or minus 1; and then a final shift instruction for multiplication by 8. Thus the generated sequence for multiplication of an unknown value X by 24 is:

TABLE 1

Instruction Sequences for Multiplication by the Integer Value 24 a) temp1 = shift X left by 1
   temp2 = add temp1 and X
   final result = shift temp2 left by 3
   where temp1 = 2 * X, temp2 = 3 * X, and final result = 24 * X
b) temp1 = shift X left by 2
   temp2 = subtract X from temp1
   final result = shift temp2 left by 3
   where temp1 = 4 * X, temp2 = 3 * X, and final result = 24 * X The Bernstein algorithm often finds the optimal sequence for performing multiplication by an integer value using shift, add, and subtract instructions. However, for some integer values the Bernstein algorithm does not produce the optimal sequence. For instance, for the integer constant N=22, the Bernstein algorithm would first try to factor out the largest power of 2, which is just 2. The remaining factor is 11. Since this 11 is neither a power of 2, nor a power of 2 plus or minus one, the Bernstein algorithm would try factoring 11+1 and 11—1. It would find equal success factoring 12=4*3, or 10=2*5, both of which have one factor of a power of 2 and one factor of a power of 2 plus or minus one. The Bernstein algorithm could also try to factor the original number 22 plus or minus one. The number 21 factors into 3*7 which are both powers of 2 plus or minus one. The number 23 does not factor evenly, but adding one to it (i.e. using the recursive nature of the Bernstein algorithm) gives 24 8*3. Thus, 4 different factor sets are generated which can result in four different instruction sequences as follows, all of which have the same number (5) of instructions and would all be considered an optimal sequence produced by the. Bernstein algorithm:

TABLE 2

Instruction Sequences for Multiplication by the Integer Value of 22 a) temp1 = shift X left by 1
   temp2 = add temp1 and X
   temp3 = shift temp2 left by 2
   temp4 = subtract X from temp3
   final result = shift temp4 by 1
   where temp1 = 2 * X, temp2 = 3 * X, temp3 = 12 * X,
   temp4 = 11 * X, and final result = 22 * X
b) temp1 = shift X left by 2
   temp2 = add X to temp1
   temp3 = shift temp2 left by 1
   temp4 = add X to temp3
   final result = shift temp4 by 1
   where temp1 = 4 * X, temp2 = 5 * X, temp3 = 10 * X, temp4 =
   11 * X, and final result = 22 * X
c) temp1 = shift X left by 1
   temp2 = add temp 1 and X
   temp3 = shift temp2 left by 3
   temp4 = subtract temp2 from temp3
   final result = add X to temp4
   where temp1 = 2 * X, temp2 = 3 * X, temp3 = 24 * X, temp4 =
   21 * X, and final result = 22 * X
d) temp1 = shift X left by 1
   temp2 = add temp1 and X
   temp3 = shift temp2 left by 3
   temp4 = subtract X from temp3
   final result = subtract X from temp4
   where temp1 = 2 * X, temp2 = 3 * X, temp3 = 24 * X, temp4 =
   23 * X, and final result = 22 * X Referring to Table 2, the instruction sequence implementations corresponding to the four factor sets for multiplication by 22 determined above using the Bernstein algorithm are shown and explained in more detail below. The first instruction sequence—Table 2(a)—corresponds to the factoring of 22 by 2 and then the further factoring of 11+1 to yield the factors of 3 and 4. It is seen in Table 2(a) that X is shifted left by 1 and then the value of X added thereto to obtain 3*X. That value of 3*X is shifted left by 2 to in effect multiply by 4 to obtain 12*X (i.e. the value of 11+1 using the factors 3 and 4). From this 12*X value, the value of X is subtracted to yield 1*X which is then multiplied by 2 using a shift left by 1 instruction to yield the final 22*X value. The second instruction sequence—Table 2(b)—corresponds to the factoring of 22 by 2 and then the further factoring of 11-1 to yield the factors of 2 and 4. It is seen in Table 2(b) that X is shifted left by 2 and then the value of X added thereto to obtain 5*X. That value of 5*X is shifted left by 1 to in effect multiply by 2 to obtain 10*X (i.e. the value of 11–1 using the factors 2 and 5). Onto this 10*X value, the value of X is added to yield 11*X which is then multiplied by 2 using a shift left by 1 instruction to yield the final 22*X value. The third instruction sequence—Table 2(c)—corresponds to the factoring of 22 minus 1=21 by 3 and 7, respectively powers of 2 minus 1. It seen in Table 2(c) that X is shifted left by 1 to in effect multiply by 2 and then the value of X added thereto to obtain 3*X. That value of 3*X is shifted left by 3 to in effect multiply by 82 to obtain 24*X. From this value of 24*X, the earlier value of 3*X is subtracted to obtain 21*X (in effect multiplication by the original factors 3 and 7). The value of X is then added to the value of 21*X to yield 22*X. The fourth instruction sequence—Table 2(d)—corresponds to the factoring of 22+1+1=24 by 3 and 8, respectively a power of 2 minus 1 and a power of 2. It is see 2(d) that X is shifted left by 1 to in effect multiply by 2 and then the value of X is added thereto to obtain 3*X. That value of 3*X is shifted left by 3 to in effect multiply by 82 to obtain 24*X. From this value of 24*X, the value of X is subtracted twice to yield 22*X.

However, none of these instruction sequences is in fact the optimal sequence. This is most noticeable by looking at the last of the proposed instruction sequences. Notice that X is subtracted twice at the end of the sequence. Instead, the value temp1 could have been subtracted once, since this value is equal to 2*X. This would have resulted in a sequence that is 4 instructions rather than 5 instructions long. In fact, there are two such sequences for multiplication by 22:

TABLE 3

Shorter Instruction Sequences for Multiplication
by the Integer Value of 22 a) temp1 = shift X left by 1
   temp2 = add temp1 and X
   temp3 = shift temp2 left by 3
   final result = subtract temp1 from temp3
   where temp1 = 2 * X, temp2 = 3 * X, temp3 = 24 * X, and final
   result = 22 * X
b) temp1 = shift X left by 3
   temp2 = subtract X from temp1
   temp3 = shift temp2 left by 1
   final result = add temp1 to temp3
   where temp1 = 8 * X, temp2 = 7 * X, temp3 = 14 * X, and final
   result = 22 * X These sequences make use of the intermediate result stored in temp1 later in the sequence. A skilled assembly language programmer might be able to come up with these sequences. Accordingly, the present invention identifies opportunities for generating this type of instruction sequence, thus reducing the number of instructions required for integer multiplication. The present invention is based on the algorithm described by Bernstein, but also looks for a new kind of factor.

Figure 3A:
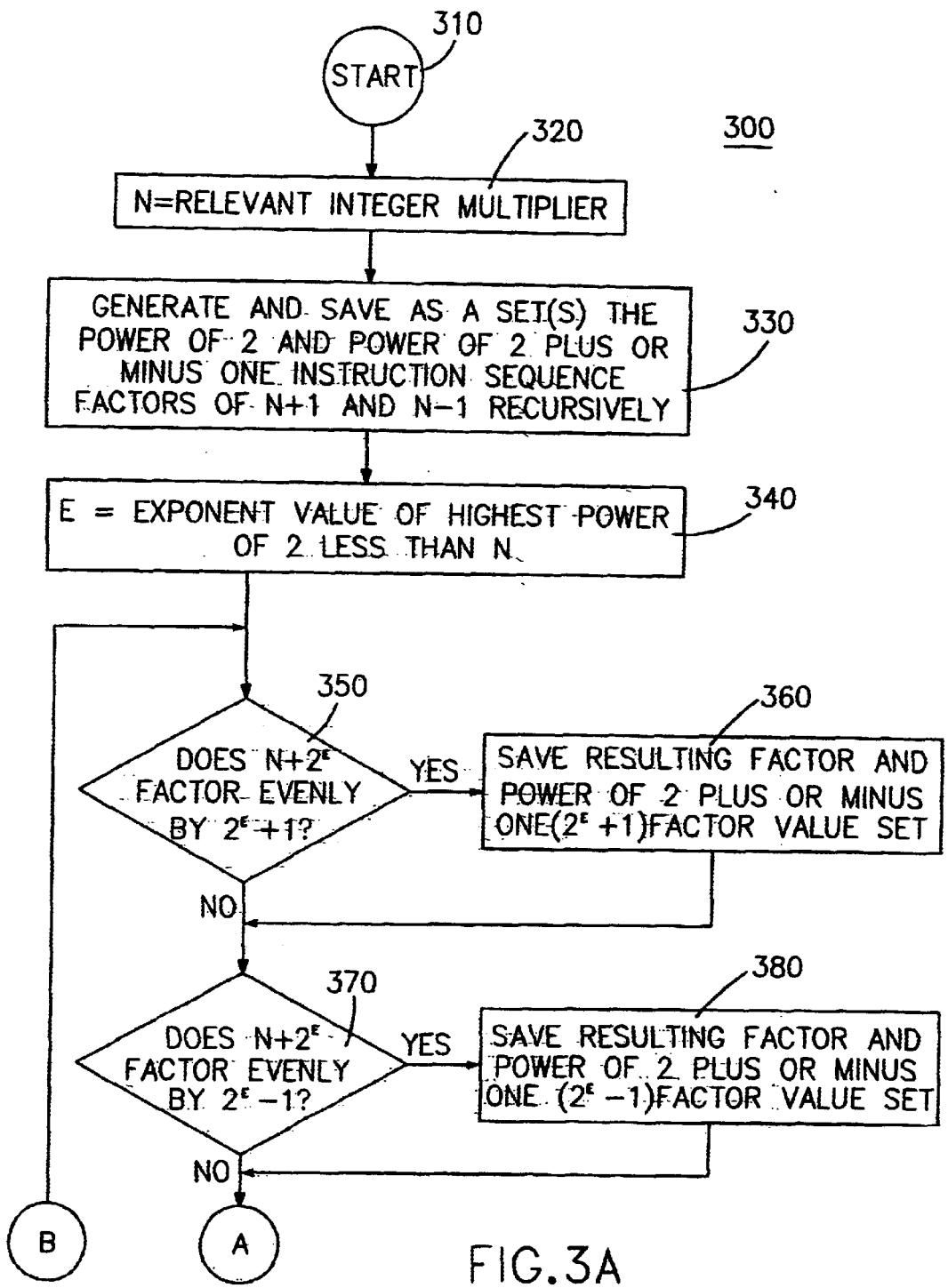
FIGS. 3A–3C is a flowchart of the method steps of the present invention.
Figure 3B:
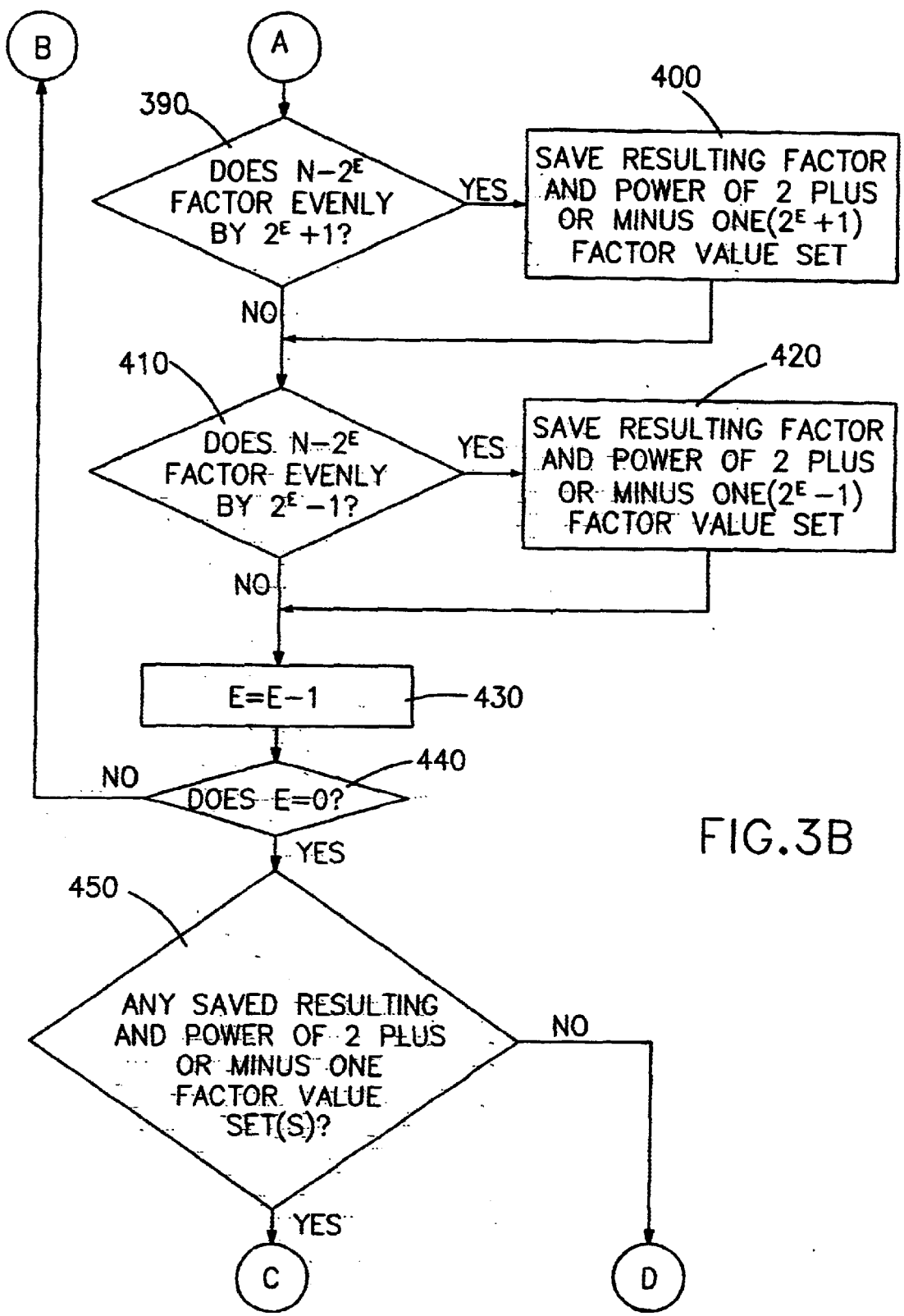
Figure 3C:
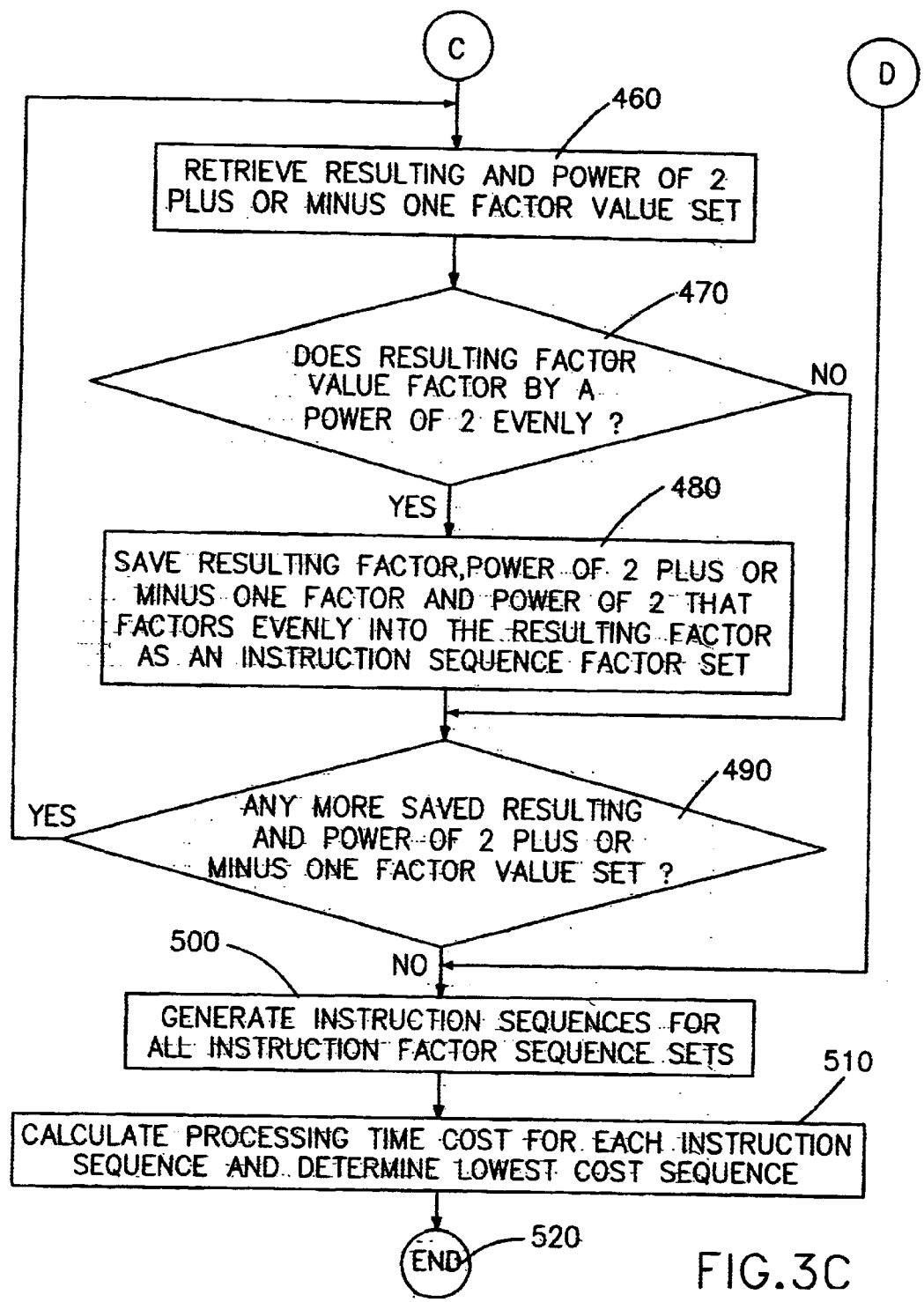

Referring to FIG. 3, the method 300 of the present invention first looks for set(s) of instruction sequence factors that are powers of 2 and powers of 2 plus or minus one for the numbers N (a relevant integer multiplier) 320, N+1 and N−1 recursively 330, in the same manner as the factoring aspect of the algorithm described by Bernstein. However, to find sequences that make use of previously computed intermediate results, the algorithm looks for a special kind of factor. It does this by trying to add or subtract all powers of 2 less than the integer multiplier N itself starting from the highest power of 2 less than N 340, and then trying to factor the resulting sum or difference by that power of 2 plus or minus one 350, 370, 390, 410, 430, 440.

Thus, for the integer N=22, the method of the present invention would try adding or subtracting 16 and factoring the results by 17 or 15, and then adding or subtracting 8 and then factoring the results by 9 or 7, and then adding or subtracting 4 and then factoring the results by 5 or 3, and then adding or subtracting 2 and then factoring the results by 3 (it ignores factoring by 1, for obvious reasons). Only when the sum or difference factors evenly by the power of 2 plus or minus one will the method of the present invention save the resulting factor and the power of 2 plus or minus one factor value set for further investigation 360, 380, 400, 420. Thus, since 22+16=38 doesn't factor by 17 or 15 it is not considered, and since 22−16=6 doesn't factor by 17 or 15 it is similarly not considered, and so on for all values of N plus or minus each power of 2 (less than N) that cannot be factored by that power of 2 plus or minus one. If there were no results 450, the method of the present invention would then proceed to generate the instruction sequences for the earlier determined instruction sequence factor set(s) 500 and calculate the lowest cost instruction sequence 510 as detailed below. However, it turns out that only 3 results factor at all, and so very little time is wasted looking into other possibilities. The 3 resulting value and power of 2 plus or minus one factor value sets are then retrieved and investigated 460, 490. It is found that 22−8=14 factors by 7, so the result 2 is investigated and since 2is a power of 2 favorable factor set for generating a shorter instruction sequence is found and saved 470, 480, it is also found that 22−4=18 factors by 3, but the result 6 is not a power of 2 so this factor set is discarded 470 as the instruction sequence cost is too high, and it is found that 22+2=24 factors by 3 and the result is 8 which is also power of 2, so it too is a favorable factor set for generating a shorter instruction sequence 470, 480. Instruction sequences can then be generated for the promising factor sets by calculating the power of 2 plus or minus one value using appropriate instruction sequences, and storing the power of 2 value in that calculation until it is used later in the instruction sequence.

Referring to Table 3, instruction sequence implementations corresponding to the two promising factor sets for multiplication by 22 just determined are shown and explained in more detail below. For the latter instruction sequence, it can be seen in Table 3(a) that X is shifted left by 1 (and stored as temp1 for later use in the sequence) and the value of X added thereto to obtain 3*X. That value of 3*X is shifted left by 3 to in effect multiply by 82 to obtain 24*X. From this last value, the earlier value of X shifted left by 1 (temp1) is subtracted to get 22*X. In the former instruction sequence, it can be seen in Table 3(b) that X is shifted left by 3 (and stored as temp1 for later use in the sequence) to in effect multiply by 82 yielding 8*X. The value of X is subtracted therefrom to yield 7*X. The value of 7*X is shifted left by 1 to in effect multiply by 2 to yield 14*X and then the earlier value of X shifted left by 3 (temp1) is added thereto to get 22*X.

It can be seen that the opportunity for finding the shorter sequences according to the present invention only occurs when relative short instruction sequences are not available for a given integer value. Any instruction sequence that can be found for an integer value that is 4 instructions or less will always have the same or fewer instructions than a sequence that uses an intermediate result. This is because instruction sequences making use of intermediate results are always at least 4 instructions long. They always contain a shift and an add or subtract for the factor which is a power of 2 plus or minus one, and an additional add or subtract to make use of the intermediate result. This totals 3 instructions, and the resulting factor cannot be simply the value 1, because this would mean that the sequence is of the form $(2^{\wedge\wedge}i)+1+(2^{\wedge\wedge}i)$, or $(2^{\wedge\wedge}i)-1+(2^{\wedge\wedge}i)$, which are simplified to $(2^{\wedge\wedge}i)$, which are simplified to $(2^{\wedge\wedge}(i+1))+1$, or $(2^{\wedge\wedge}(i+1))-1$ respectively (which sequences both contain just 1 shift instruction and 1 add or subtract instruction). It is found that instruction sequences that make use of intermediate values later in the sequence only occur when short sequences are not available, thus drastically reducing the number of possible sequences that need to be investigated to find the optimal sequence.

Hence, instruction sequences that make use—of intermediate values that have fewer instructions than instruction sequences found by the Bernstein algorithm can be found and generated without a significant increase in computational cost. The resulting sequences are 1 or more instructions shorter that those generated by the Bernstein algorithm about 5% of the time for numbers less than 1000, and occur much more frequently as the integer values get larger.

Taking the factor sets determined earlier using the factoring aspect of the Bernstein algorithm of the method of the present invention and the promising factor sets determined above by improvement of the method of the present invention; appropriate instruction sequences are fashioned for each such set of determined factors as in the Bernstein algorithm 500. Actual instruction sequences for N=22 can be seen in Tables 2 and 3 above. Like the Bernstein algorithm, the cost for each instruction sequence is then calculated based on the processing time cost of the instruction sequence on a particular processor and then the lowest cost instruction sequence is found for use 510.

The present invention may also be easily extended to division operations using an integer. This is done by converting the division by an integer into a sequence of instructions for multiplication by an integer followed by a shift right (division by a power of 2) instruction. More particularly, to determine a division by an integer C, the decimal value of 1/C needs to be determined, multiplied by a sufficiently large power of 2 and then divided by the same power of 2. For example, a division of x by 17 would become:

$= x*(1/17*2^{\wedge}24)/2^{\wedge}24$ $= x*(16777216/17)/16777216$ $= x*986895/16777216$ (rounding the value of 16777216/17 down to the nearest integer)

From this last expression, an optimal sequence of shifts, adds and/or subtracts can be found for the multiplication (*986895) portion of this expression in accordance with the invention and then a shift right of 24 bits to perform the division by $2^{\wedge} \geq (16777216)$. The only requirement is that a power of 2 that is sufficiently large must be chosen so that the answer is correct. There exists well-known techniques in the art to determine the appropriate power of 2.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the present invention has been described in relation to the shift, add and subtract ALU instructions (only because they are the simplest subset of commonly available ALU instructions that can be used to perform integer multiplication), the present invention need not be solely implemented using those instruction. It will be apparent to those skilled in the art that the present invention may equally be implemented using different ALU instructions or in altogether different implementations of ALU-like instructions available in certain computer architectures. For example, the present invention should easily be extendable to computer architectures that have instructions like shiftadd and shiftsubtract available.

Further, the present invention can be easily implemented to handle negative numbers. For example, the number could be treated as positive, and the result is made negative by either a negate instruction at the end of processing, or a reversal of the source operands to a subtract instruction.

The present invention may also be implemented in multiple processor or ALU systems. Although the generated instruction sequence is a dependent sequence where each successive instruction depends on the result of the last instruction, it should be apparent to those skilled in the art to break any given multiplication into two separate multiplications and add or subtract the results to get the final answer. This can be accomplished by first calculating the fewest number of powers of 2 that can be used to add and subtract to get the integer value. For example, the number 1158 is simply 1024+128+8−2, or 1024+128+4+2. Grouping power of 2 into 2 equal groups, the results 1052 and 6 are found. It is then possible to use the present invention to find optimal sequences for each of these numbers.

For processors that have more than one fixed point unit (capable of performing arithmetic operations such as the shift left, add, and subtract instructions) it is possible to use instruction sequences that employ more instructions than as determined by the Bernstein algorithm or the present invention but execute in fewer cycles by, for example, executing more than one instruction per cycle. To generate a sequence that makes use of this processor feature, it is necessary that some of the instructions not depend on the results of the previous instructions. For example, the instruction sequence for multiplication of a value by the number 10 would normally comprise a shift left by 2 of the value (multiplication by 4), adding the original value (the total being a multiplication by 5), and then performing a shift left by 1 of the sum (multiplication by 2 to get a total multiplication by 10). In a processor with two fixed point units, it is possible to use an instruction sequence to perform the same multiplication of a value by 10 that comprises shifting the original value left by 1 (multiplication by 2) while simultaneously taking that original value and shifting it left by 3 (multiplication by 82). Then, in the second cycle, the two results (multiplication by 2 and by 82) are added together to yield a multiplication of the value by 10. This second instruction sequence will execute in one less cycle than the first instruction sequence (but will use one extra register).

In general, when there are multiple fixed point units, it is usually the case that an instruction sequence making use of some kind of instruction level parallelism (ILP) within the sequence will execute in the same or fewer cycles than as determined by the Bernstein algorithm or the present invention. However, the trade off is that these instruction sequences use more registers (which can lead to spill code being generated if all the registers are in use) and/or use more instructions (which can have a negative impact on performance if there is an increase in i-cache misses, and can lead to slower code because there are fewer free units for other code to be scheduled in parallel). Accordingly, the present invention can also be useful for processors with multiple fixed point units, even when optimal parallel instruction sequences are calculated for such processors, because it is sometimes the case that an instruction sequence can be found according to the present invention that executes in the same number of cycles as an optimal parallel instruction sequence. In those cases, the instruction sequence determined by the present invention is superior because it uses fewer instructions and/or fewer registers than the optimal parallel instruction sequence.

Further, there are a number of machine architectures that provide an instruction that performs both a shift left (usually of only 1–4 bits) and an add in one instruction, call SLLADD. Generating instruction sequences for architectures that provide this instruction can add more complexity to the algorithm but the present invention is still useful and capable of finding the best dependent instruction sequences for these architectures, because it often would have performed a shift and then an add instruction anyway.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program product. Such an article of manufacture, program storage device or computer program product may include, but is not limited to, CD-ROMs, diskettes, tapes, hard drives, computer RAM or ROM and/or the electronic, magnetic, optical, biological or other similar embodiment of the program. Indeed, the article of manufacture, program storage device or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

The embodiments of the invention in which an exclusive property or privilege is claimed are defined as follows:

1. A computer-implemented method for multiplication by an integer comprising the steps of:
    (a) recursively finding the factors of the integer using a power of 2, a power of 2 plus 1 and a power of 2 minus 1;
    (b) recursively finding one of the factors of the integer (or the factors found in (a)) plus and minus 1; using a power of 2, a power of 2 plus 1; and a power of 2 minus 1;
    (c) adding to and subtracting from the integer all powers of 2 less than the integer;
    (d) finding the factors of each resulting sum and difference of (c) using the power of 2 used in calculating the sum and difference of (c) plus and minus 1;
    (e) constructing one or more instruction sequences based upon the factors found in (a) and (b), and upon the factors found in (d) if a resulting sum or difference factored evenly in (d) and the resulting factor is a power of 2;
    (f) finding the lowest cost instruction sequence from the one or more instruction sequences; and
    (g) executing the lowest cost instruction sequence to effect the multiplication by the integer.

2. The method of claim 1 wherein the step of constructing one or more instruction sequences comprises generating one or more shift, add or subtract instructions based upon the found factors.

3. The method of claim 1 wherein steps (a)–(f) are performed in a compiler.

4. The method of claim 1 wherein the step of finding the lowest cost instruction sequence comprises calculating a cost for each instruction sequence based upon the processing time of each instruction sequence.

5. A computer-implemented method for generating instruction sequences for multiplication, by an integer comprising the steps of:
    (a) recursively finding the factors of the integer using a power of 2, a power of 2 plus 1; and a power of 2 minus 1;
    (b) recursively finding the factors of the integer (or the factors found in (a)) plus and minus 1; using a power of 2, a power of 2 plus 1; and a power of 2 minus 1;
    (c) adding to and subtracting from the integer all powers of 2 less than the integer;
    (d) finding the factors of each resulting sum and difference of (c) using the power of 2 used in calculating the sum and difference of (c) plus and minus 1;
    (e) constructing one or more instruction sequences based upon the factors found in (a) and (b), and upon the factors found in (d) if a resulting sum or difference factored evenly in (d) and the resulting factor is a power of 2, and
    (f) finding the lowest cost instruction sequence from the one or more instruction sequences.

6. The method of claim 5 wherein the step of constructing one or more instruction sequences comprises generating one or more shift, add or subtract instructions based upon the found factors.

7. The method of claim 5 wherein steps (a)–(f) are performed in a compiler.

8. The method of claim 5 wherein the step of finding the lowest cost instruction sequence comprises calculating a cost for each instruction sequence based upon the processing time of each instruction sequence.

9. A computer-implemented method for multiplication by an integer comprising the steps of:
    (a) adding to and subtracting from the integer all powers of 2 less than the integer;
    (b) finding the factors of each resulting sum and difference of (a) using the power of 2 used in calculating the sum and difference of (a) plus and minus 1;
    (c) if a resulting sum or difference factored evenly in (b) and the resulting factor is a power of 2, constructing one or more instruction sequences based upon the factors found in step (b); and
    (d) executing the instruction sequence to effect the multiplication by the integer.

10. The method of claim 9 wherein the step of constructing one or more instruction sequences comprises generating one or more shift, add or subtract instructions based upon the found factors.

11. The method of claim 9 wherein steps (a)–(c). are performed in a compiler.

12. The method of claim 9 further comprising the steps of determining one or more instruction sequences based upon the Bernstein algorithm and determining the lowest cost instruction sequence from among the one or more sequences determined using the Bernstein algorithm and the one or more instruction sequences constructed in step (c).

13. A computer-implemented method for generating instruction sequences for multiplication by an integer comprising the steps of:
    (a) adding to and subtracting from the integer all powers of 2 less than the integer;
    (b) finding the factors of each resulting sum and difference of (a) using the power of 2 used in calculating the sum and difference of (a) plus and minus 1; and (c) if a resulting sum or difference factored evenly in (b) and the resulting factor is a power of 2, constructing one or more instruction sequences based upon the factors found in step (b).

14. The method of claim 13 wherein the step of constructing one or more instruction sequences comprises generating one or more shift, add or subtract instructions based upon the found factors.

15. The method of claim 13 wherein the steps are performed in a compiler.

16. The method of claim 13 further comprising the steps of determining one or more instruction sequences based upon the Bernstein algorithm and determining the lowest cost instruction sequence from among the one or more sequences determined using the Bernstein algorithm and the one or more instruction sequences constructed in step (c).

17. A computer-implemented method for multiplication by an integer comprising the steps of:
for each power of 2 less than the integer,
(i) adding the power of 2 to the integer,
(ii) finding the factors of the sum in (i) using the power of 2 in (i) plus or minus 1;
(iii) subtracting the power of 2 from the integer,
(iv) finding the factors of the difference in (iii) using the power of 2 in (iii) plus or minus 1,
(v) ignoring those factors determined in (ii) and (iv) where the respective sum or difference does not factor evenly by the power of 2 plus or minus 1, and
(vi) where a sum or difference factors evenly in (ii) or (iv) and the resulting factor for that sum or difference is a power of 2, generating an instruction sequence based upon those factors; and
executing the instruction sequence.

18. The method of claim 17 wherein the step of generating an instruction sequence comprises generating one or more shift, add or subtract instructions based upon the found factors.

19. The method of claim 17 wherein all steps but the step of executing are performed in a compiler.

20. The method of claim 17 further comprising the steps of determining one or more instruction sequences based upon the Bernstein algorithm and determining the lowest cost instruction sequence from among the one or more sequences determined using the Bernstein algorithm and the one or more instruction sequences determined in step (vi).

21. A computer-implemented method for generating instruction sequences for multiplication by an integer comprising the steps of:
for each power of 2 less than the integer,
(i) adding the power of 2 to the integer,
(ii) finding the factors of the sum in (i) using the power of 2 in (i) plus or minus 1,
(iii) subtracting the power of 2 from the integer,
(iv) finding the factors of the difference in (iii) using the power of 2 in (iii) plus or minus 1,
(v) ignoring those factors determined in iii) and (iv) where the respective sum or difference does not factor evenly by the power of 2 plus or minus 1, and
(vi) where a sum or difference factors evenly in (ii) or (iv) and the resulting factor for that sum or difference is a power of 2, generating an instruction sequence based upon those factors.

22. The method of claim 21 wherein the step of generating an instruction sequence comprises generating one or more shift, add or subtract instructions based upon the found factors.

23. The method of claim 21 wherein the steps are performed in a compiler.

24. The method of claim 21 further comprising the steps of determining one or more instruction sequences. based upon the Bernstein algorithm and determining the lowest cost instruction sequence from among the one or more sequences determined using the Bernstein algorithm and the one or more instruction sequences determined in step (vi).

25. A computer program product for multiplication by an integer, the computer program product comprising:
(a) computer readable code means for recursively finding the factors of the integer using a power of 2, a power of 2 plus 1; and a power of 2 minus 1;
(b) computer readable code means for recursively finding the factors of the integer (or the factors found in (a)) plus and minus 1; using a power of 2, a power of 2 plus 1 and a power of 2 minus 1;
(c) computer readable code means for adding to and subtracting from the integer all powers of 2 less than the integer;
(d) computer readable code means for finding the factors of each resulting sum and difference of (c) using the power of 2 used in calculating the sum and difference of (c) plus and minus 1;
(e) computer readable code means for constructing one or more instruction sequences based upon the factors found in (a) and (b), and upon the factors found in (d) if a resulting sum or difference factored evenly in (d) and the resulting factor is a power of 2;
(f) computer readable code means for finding the lowest cost instruction sequence from the one or more instruction sequences; and
(g) computer readable code means for executing the lowest cost instruction sequence to effect the multiplication by the integer.

26. A computer program product for generating instruction sequences for multiplication by an integer, the computer program product comprising:
(a) computer readable code means for recursively finding the factors of the integer using a power of 2, a power of 2 plus 1 and a power of 2 minus 1;
(b) computer readable code means for recursively finding the factors of the integer (or the factors found in (a)) plus and minus 1; using a power of 2, a power of 2 plus. 1 and a power of 2 minus 1;
(c) computer readable code means for adding to and subtracting from the integer all powers of 2 less than the integer;
(d) computer readable code means for finding the factors of each resulting sum and difference of (c) using the power of 2 used in calculating the sum and difference of (c) plus and minus 1;
(e) computer readable code means for constructing one or more instruction sequences based upon the factors found in (a) and (b), and upon the factors found in (d) if a resulting sum or difference factored evenly in (d) and the resulting factor is a power of 2; and
(f) computer readable code means for finding the lowest cost instruction sequence from the one or more instruction sequences.

27. A computer program product for multiplication by an integer, the computer program product comprising:
(a) computer readable code means for adding to and subtracting from the integer all powers of 2 less than the integer;
(b) computer readable code means for finding the factors of each resulting sum and difference of (a) using the power of 2 used in calculating the sum and difference of (a) plus and minus 1;
  (c) computer readable code means for, if a resulting sum or difference factored evenly in (b) and the resulting factor is a power of 2, constructing one or more instruction sequences based upon the factors found in step (b); and
  (d) computer readable code means for executing the instruction sequence to effect the multiplication by the integer.

28. A computer program product for generating instruction sequences for multiplication by an integer, the computer program product comprising:
  (a) computer readable code means for adding to and subtracting from the integer all powers of 2 less than the integer;
  (b) computer readable code means for finding the factors of each resulting sum and difference of (a) using the power of 2 used in calculating the sum and difference of (a) plus and minus 1; and
  (c) computer readable code means for, if a resulting sum or difference factored evenly in (b) and the resulting factor is a power of 2, constructing one or more instruction sequences based upon the factors found in step (b).

29. A computer program product for multiplication by an integer, the computer program product comprising:
  for each power of 2 less than the integer,
    (i) computer readable code means for adding the power of 2 to the integer,
    (ii) computer readable code means for finding the factors of the sum in (i) using the power of 2 in (i) plus or minus 1,
    (iii) computer readable code means for subtracting the power of 2 from the integer;
    (iv) computer readable code means for finding the factors of the difference in (iii) using the power of 2 in (iii) plus or minus 1,
    (v) computer readable code means for ignoring those factors determined in (ii) and (iv) where the respective sum or difference does not factor evenly by the power of 2 plus or minus 1, and
    (vi) computer readable code means for, where a sum or difference factors evenly in (ii) or (iv) and the resulting factor for that sum or difference is a power of 2, generating an instruction sequence based upon those factors; and
  computer readable code means for executing the instruction sequence.

30. A computer program product for generating instruction sequences for multiplication by an integer, the computer program product comprising:
  for each power of 2 less than the integer,
    (i) computer readable code means for adding the power of 2 to the integer,
    (ii) computer readable code means for finding the factors of the sum in (i) using the power of 2 in (i) plus or minus 1,
    (iii) computer readable code means for subtracting the power of 2 from the integer,
    (iv) computer readable code means for finding the factors of the difference in (iii) using the power of 2 in (iii) plus or minus 1,
    (v) computer readable code means for ignoring those factors determined in (ii) and (iv) where the respective sum or difference does not factor evenly by the power of 2 plus or minus 1, and
    (vi) computer readable code means for, where a sum or difference factors evenly in (ii) or (iv) and the resulting factor for that sum or difference is a power of 2, generating an instruction sequence based upon those factors.

* * * * *